(12) United States Patent
Yu

(10) Patent No.: US 11,153,662 B2
(45) Date of Patent: Oct. 19, 2021

(54) DISPLAY DEVICE AND METHOD FOR CONTROLLING THE SAME

(71) Applicant: SAMSUNG ELECTRONICS CO., LTD., Suwon-si (KR)

(72) Inventor: Jinkyu Yu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/690,850

(22) Filed: Nov. 21, 2019

(65) Prior Publication Data
US 2020/0186891 A1    Jun. 11, 2020

(30) Foreign Application Priority Data
Dec. 6, 2018  (KR) .................... 10-2018-0155780

(51) Int. Cl.
*H04N 21/81*      (2011.01)
*H04N 21/431*     (2011.01)
*H04N 21/434*     (2011.01)
*H04N 21/4363*    (2011.01)
*H04N 21/45*      (2011.01)
*H04N 21/482*     (2011.01)

(52) U.S. Cl.
CPC ......... *H04N 21/812* (2013.01); *H04N 21/434* (2013.01); *H04N 21/4316* (2013.01); *H04N 21/43635* (2013.01); *H04N 21/43637* (2013.01); *H04N 21/4532* (2013.01); *H04N 21/4821* (2013.01)

(58) Field of Classification Search
None
See application file for complete search history.

(56) References Cited

U.S. PATENT DOCUMENTS

| 9,703,179 B2 | 7/2017 | Bonner et al. |
| 10,062,093 B1* | 8/2018 | Ratner ............... G06Q 30/0269 |
| 2010/0050228 A1 | 2/2010 | Kawashima |
| 2011/0273625 A1* | 11/2011 | McMahon ............ H04W 12/08 348/734 |

(Continued)

FOREIGN PATENT DOCUMENTS

| EP | 2373073 A1 | 10/2011 |
| JP | 2010-086492 A | 4/2010 |

(Continued)

OTHER PUBLICATIONS

Communication dated Mar. 27, 2020 from the European Patent Office in application No. 19210437.0.

(Continued)

*Primary Examiner* — Omar S Parra
(74) *Attorney, Agent, or Firm* — Sughrue Mion, PLLC

(57) ABSTRACT

Disclosed is a display device. The display device includes: a display; a communication interface; and a processor configured to establish a connection with an external device through the communication interface and receive a data packet from the external device through the established connection, obtain mode information of the display device, obtain advertising content for the external device based on identification information of the external device included in the data packet and based on the mode information, and control the display to display the obtained advertising content.

20 Claims, 15 Drawing Sheets

(56) References Cited

U.S. PATENT DOCUMENTS

| | | | |
|---|---|---|---|
| 2013/0176398 | A1 | 7/2013 | Bonner et al. |
| 2016/0323554 | A1* | 11/2016 | Oh .................. G09G 5/006 |
| 2017/0285449 | A1 | 10/2017 | Bonner et al. |
| 2019/0045245 | A1* | 2/2019 | Numao .......... H04N 21/234363 |

FOREIGN PATENT DOCUMENTS

| | | | |
|---|---|---|---|
| KR | 10-0824592 B1 | 4/2008 | |
| KR | 1020100050829 A | 5/2010 | |
| KR | 10-2010-0089328 A | 8/2010 | |
| KR | 101271767 B1 | 6/2013 | |
| KR | 1020140022976 A | 2/2014 | |
| KR | 1020140112022 A | 9/2014 | |
| KR | 1020170133110 A | 12/2017 | |
| WO | 2015179165 A1 | 11/2015 | |

OTHER PUBLICATIONS

International Search Report and Written Opinion (PCT/ISA/210 & 237) dated Apr. 23, 2020 from the International Searching Authority in application No. PCT/KR2019/017111.

Tanenbaum, A. et. al., "Computer Networks", Fourth Edition, Jan. 1 2004, XP055603667, pp. 444-556 (118 pages), https://www.amazon.co.uk/Computer-Networks-Andrew-S-Tanenbaum/dp/8177581651.pdf.

* cited by examiner

| InfoFrame Type Code | | InfoFrame Type = $03_{16}$ |
|---|---|---|
| InfoFrame Version Number | | Version = $01_{16}$ |
| Length of Source Product Description InfoFrame | | Length of Source Product Description InfoFrame = 25 |
| Data Byte 1 | 0 | Vendor Name Character 1 VN1 (7bit ASCII code) |
| Data Byte 2 | 0 | Vendor Name Character 2 VN2 |
| Data Byte 3 | 0 | Vendor Name Character 3 VN3 |
| Data Byte 4 | 0 | Vendor Name Character 4 VN4 |
| Data Byte 5 | 0 | Vendor Name Character 5 VN5 |
| Data Byte 6 | 0 | Vendor Name Character 6 VN6 |
| Data Byte 7 | 0 | Vendor Name Character 7 VN7 |
| Data Byte 8 | 0 | Vendor Name Character 8 VN8 |
| Data Byte 9 | 0 | Product Description Character 1  PD1 (7-bit ASCII code) |
| Data Byte 10 | 0 | Product Description Character 2  PD2 |
| Data Byte 11 | 0 | Product Description Character 3  PD3 |
| Data Byte 12 | 0 | Product Description Character 4  PD4 |
| Data Byte 13 | 0 | Product Description Character 5  PD5 |
| Data Byte 14 | 0 | Product Description Character 6  PD6 |
| Data Byte 15 | 0 | Product Description Character 7  PD7 |
| Data Byte 16 | 0 | Product Description Character 8  PD8 |
| Data Byte 17 | 0 | Product Description Character 9  PD9 |
| Data Byte 18 | 0 | Product Description Character 10  PD10 |
| Data Byte 19 | 0 | Product Description Character 11  PD11 |
| Data Byte 20 | 0 | Product Description Character 12  PD12 |
| Data Byte 21 | 0 | Product Description Character 13  PD13 |
| Data Byte 22 | 0 | Product Description Character 14  PD14 |
| Data Byte 23 | 0 | Product Description Character 15  PD15 |
| Data Byte 24 | 0 | Product Description Character 16  PD16 |
| Data Byte 25 | | Source Device Information |

| Code | Source Device Information |
|---|---|
| 00h | unknown |
| 01h | Digital STB |
| 02h | DVD player |
| 03h | D-VHS |
| 04h | HDD Videorecorder |
| 05h | DVC |
| 06h | DSC |
| 07h | Video CD |
| 08h | Game |
| 09h | PC general |
| 0Ah | Blu-Ray Disc (BD) |
| 0Bh | Super Audio CD |
| 0Ch ... FFh- | Reserved |

100

DISPLAY DEVICE AND METHOD FOR CONTROLLING THE SAME

CROSS-REFERENCE TO RELATED APPLICATION(S)

This application is based on and claims priority under 35 U.S.C. § 119 to Korean Patent Application No. 10-2018-0155780, filed on Dec. 6, 2018, in the Korean Intellectual Property Office, the disclosure of which is incorporated by reference herein in its entirety.

BACKGROUND

Field

Apparatuses and methods consistent with the disclosure relate to a display device and a method for controlling the same, and more particularly, to a display device displaying an advertising content, and a method for controlling the same.

Description of the Related Art

In accordance with the development of electronic technology, various types of electronic devices have been developed and spread. Particularly, a display device, which has been used the most recently, such as a television (TV) or a mobile device, has been rapidly developed in recent years.

The display device such as a smart TV displayed in a shop or the like directly displays an advertisement which had been conventionally provided by using a brochure, a booklet, an external sticker, or the like. However, a device without a display cannot but use the conventional method.

SUMMARY OF THE INVENTION

Embodiments of the disclosure overcome the above disadvantages and other disadvantages not described above. Also, the disclosure is not required to overcome the disadvantages described above, and an embodiment of the disclosure may not overcome any of the problems described above.

According to an aspect of the disclosure, there is provided a display device comprising: a display; a communication interface; and a processor configured to: establish a connection with an external device through the communication interface and receive a data packet from the external device through the established connection, obtain mode information of the display device, obtain advertising content for the external device based on identification information of the external device included in the data packet and based on the mode information, and control the display to display the obtained advertising content.

The identification information of the external device may comprise at least one of a model name, manufacturer information, or device type information of the external device.

The processor may be further configured to obtain the identification information of the external device from the data packet, a source product description (SPD) packet received through the communication interface in accordance with a high definition multimedia interface (HDMI) communication standard.

The processor may be further configured to obtain the identification information of the external device from the data packet, which is a wireless data packet received through the communication interface in accordance with at least one of a wireless fidelity (Wi-Fi) communication standard or a Bluetooth communication standard.

The processor may be further configured to transmit the identification information of the external device to an external server, and receive first advertising content corresponding to the identification information of the external device from the external server.

The display device may further comprise a memory storing second advertising content, wherein the processor may be further configured to transmit the identification information of the external device to the external server and receive the first advertising content corresponding to the identification information of the external device from the external server based on the second advertising content corresponding to the identification information of the external device not being stored in the memory.

The display device may further comprise a memory storing the second advertising content, wherein the processor may be further configured to compare the first advertising content with the second advertising content, and update the second advertising content stored in the memory to the first advertising content based on identifying that an update version of the first advertising content is higher than an update version of the second advertising content, wherein the displayed advertising content may be one of the first advertising content or the second advertising content.

The processor may be further configured to control the display to superimpose the displayed advertising content on a partial region of the display on which a video is displayed.

The displayed advertising content may be obtained based on an occurrence of an event of entering a predetermined display mode.

The display device may further comprise a sensor configured to obtain user sensing data corresponding to a user, wherein the processor may be further configured to determine at least one of a type of the displayed advertising content, a display position of the displayed advertising content, or a display time of the displayed advertising content, based on the user sensing data received from the sensor.

The display device may further comprise a sensor configured to obtain user sensing data corresponding to a user, wherein the processor may be further configured to obtain, in a case where third advertising content for the display device and the first or the second advertising content for the external device are displayed together, at least one of a display position or a display time of each of the third advertising content and the first or the second advertising content, based on the user sensing data received from the sensor.

The processor may be further configured to display guide information indicating that the displayed advertising content is a content corresponding to the external device performing communication with the display device.

According to another aspect of the disclosure, there is provided a method for controlling a display device, the method comprising: establishing a connection with an external device through a communication interface and receiving a data packet from the external device through the established connection; obtaining mode information of the display device; obtaining advertising content for the external device based on identification information of the external device included in the data packet and based on the mode information; and displaying the obtained advertising content.

The identification information of the external device may comprise at least one of a model name, manufacturer information, or device type information of the external device.

In the obtaining of the advertising content, the identification information of the external device may be obtained from the data packet, an SPD packet received through the communication interface in accordance with an HDMI communication standard.

In the obtaining of the advertising content, the identification information of the external device may be obtained from the data packet, a wireless packet received through the communication interface in accordance with at least one of a Wi-Fi communication standard or a Bluetooth communication standard.

In the obtaining of the advertising content, the identification information of the external device may be transmitted to an external server, and first advertising content corresponding to the identification information of the external device is received from the external server.

The obtaining of the advertising content may comprise: identifying whether second advertising content corresponding to the identification information of the external device is stored in a memory; and transmitting the identification information of the external device to the external server and receiving the first advertising content corresponding to the identification information of the external device from the external server, based on the second advertising content corresponding to the identification information of the external device not being stored in the memory.

The method may further comprise: comparing the first advertising content with the second advertising content; and updating the second advertising content stored in the memory to the first advertising content based on identifying that an update version of the first advertising content is higher than an update version of the second advertising content, wherein the displaying the obtaining advertising content comprises displaying one of the first advertising content or the second advertising content.

According to another aspect of the disclosure, there is provided a non-transitory computer-readable medium storing a computer command which allows an electronic device to perform an operation in the case where the computer command is executed by a processor of a display device, the operation including: establishing a connection with an external device through a communication interface and receiving a data packet from the external device through the established connection; obtaining mode information of the display device; obtaining advertising content for the external device based on identification information of the external device included in the data packet and based on the mode information; and displaying the obtained advertising content.

According to another aspect of the disclosure, there is provided an apparatus comprising: a memory storing one or more instructions; and a processor configured to execute the one or more instructions to: receive a data packet from an external device, obtain mode information of the apparatus; obtain advertising content for the external device based on identification information of the external device included in the data packet and based on the mode information, and control a display to display the obtained advertising content.

The mode information may indicate that at least one of the apparatus or the external device is located at a shop for display.

The data packet may comprise a source product description (SPD) packet, wherein a reserved bit in the SPD is activated to indicate that the external device is located at a shop for display.

According to another aspect of the disclosure, there is provided an apparatus comprising: a memory storing one or more instructions; and a processor configured to execute the one or more instructions to: establish a connection with an external device through a communication interface, and transmit a data packet to the external device through the established connection to facilitate the external device to display advertisement content corresponding to the apparatus, wherein the data packet comprises mode information corresponding to a location of the apparatus or a location of the external device.

The mode information may indicate that the apparatus is located at a shop for display.

The data packet may comprise a source product description (SPD) packet, and wherein a reserved bit in the SPD is activated to indicate that the apparatus is located at a shop for display.

Additional and/or other aspects and advantages of the disclosure will be set forth in part in the description which follows and, in part, will be obvious from the description, or may be learned by practice of the disclosure.

BRIEF DESCRIPTION OF THE DRAWING FIGURES

The above and/or other embodiments of the disclosure will be more apparent by describing certain embodiments of the disclosure with reference to the accompanying drawings, in which:

FIG. 3A illustrates an example of a source product description (SPD) packet according to an embodiment of the disclosure;

FIG. 3C illustrates another example of the SPD packet according to an embodiment of the disclosure;

DETAILED DESCRIPTION OF THE EXEMPLARY EMBODIMENTS

Figure 1:
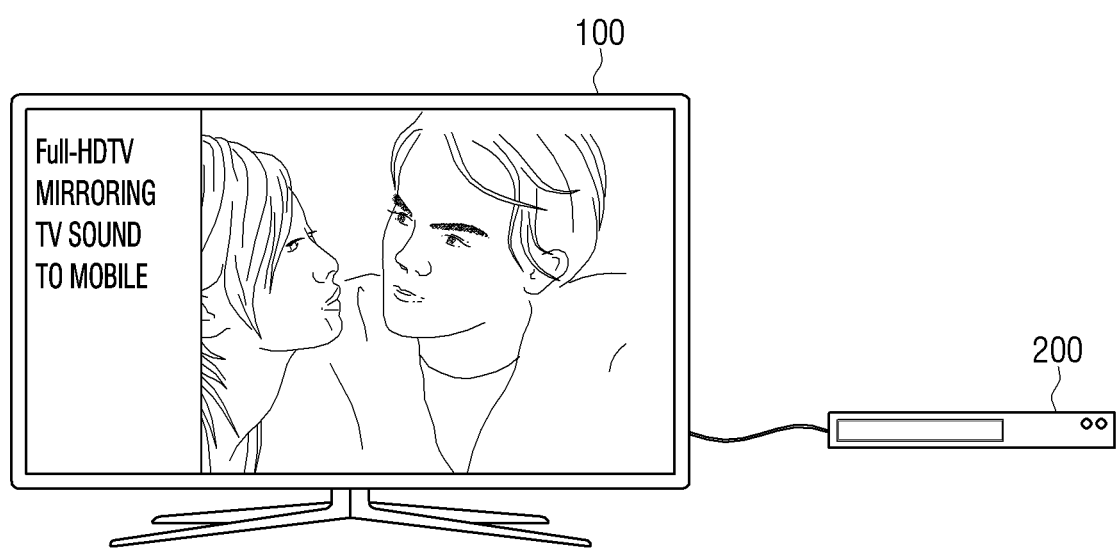
FIG. 1 is a view illustrating a configuration of an electronic system according to an embodiment of the disclosure.

The disclosure provides a display device obtaining identification information of an external device coupled to the display device to provide an advertising content for the external device, and a method for controlling the same.

Hereinafter, the disclosure will be described in detail with reference to the accompanying drawings.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen may exist, in which case, the meaning of such terms will be mentioned in detail in a corresponding description portion of the disclosure. Therefore, the terms used in embodiments of the disclosure should be defined based on the meaning of the terms and the contents throughout the disclosure rather than simple names of the terms.

In the disclosure, expressions such as "have", "may have", "include", "may include", or the like, indicate existence of a corresponding feature (for example, a numerical value, a function, an operation, or a component such as a part), and does not exclude existence of an additional feature.

An expression "at least one of A or/and B" should be understood as indicating "A or B", or "A and B".

Expressions "first", "second", or the like, used in the disclosure may indicate various components regardless of a sequence and/or importance of the components, will be used only in order to distinguish one component from the other components, and do not limit the corresponding components.

When it is mentioned that any component (for example, a first component) is (operatively or communicatively) coupled with/to or is connected to another component (for example, a second component), it is to be understood that any component is directly coupled to another component or may be coupled to another component through the other component (for example, a third component).

Singular forms are intended to include plural forms unless the context clearly indicates otherwise. It will be further understood that terms "include" or "formed of" used in the disclosure specify the presence of features, numerals, steps, operations, components, parts, or combinations thereof mentioned in the disclosure, but do not preclude the presence or addition of one or more other features, numerals, steps, operations, components, parts, or combinations thereof.

In the disclosure, a "module" or a "-er/or" may perform at least one function or operation, and be implemented by hardware or software or be implemented by a combination of hardware and software. In addition, a plurality of "modules" or a plurality of "-ers/ors" may be integrated in at least one module and be implemented by at least one processor (not illustrated) except for a "module" or a "-er/or" that needs to be implemented by specific hardware.

Hereinafter, an embodiment of the disclosure will be described in detail with reference to the accompanying drawings.

FIG. 1 is a view illustrating a configuration of an electronic system according to an embodiment of the disclosure.

As illustrated in FIG. 1, an electronic system 1000 includes a display device 100 and an electronic device 200.

The display device 100 may be implemented by various types of devices including a display. For example, the display device 100 may be implemented by various types of content output devices capable of outputting a content or information provided from the electronic device 200 or an external server, such as a network television (TV), a smart TV, an Internet TV, a web TV, an Internet protocol television (IPTV), a signage, and a personal computer (PC).

The electronic device 200 may be implemented by various types of devices providing a content to the display device 100. For example, the electronic device 200 may be implemented by various types of content providing devices that provide a content to the display device 100 and do not include a display, such as a digital versatile disc (DVD) player, a Blu-ray disc player, a set-top box, a game machine, a home appliance, and a medical device.

The display device 100 and the electronic device 200 may perform communication with each other by using at least one of a wired communication manner such as high definition multimedia interface (HDMI), or a wireless communication manner such as wireless fidelity (Wi-Fi) or Bluetooth.

According to an embodiment of the disclosure, the display device 100 may provide a shop mode (or an advertising mode) used at the time of being displaying in a shop. The shop mode provides a function that is not provided in a home mode for use in general homes. In particular, the shop mode may provide a function of displaying main information of the display device on a screen. Therefore, an advertising content for the display device 100 may be displayed on the screen as illustrated in FIG. 1 in the shop mode.

However, the electronic device 200 that does not include a display may not display an advertising content, unlike the display device 100. In this regard, hereinafter, various embodiments in which an advertising content for the electronic device 200 may be provided through the display device 100 that may perform communication with the electronic device 200 will be described.

Figure 2:
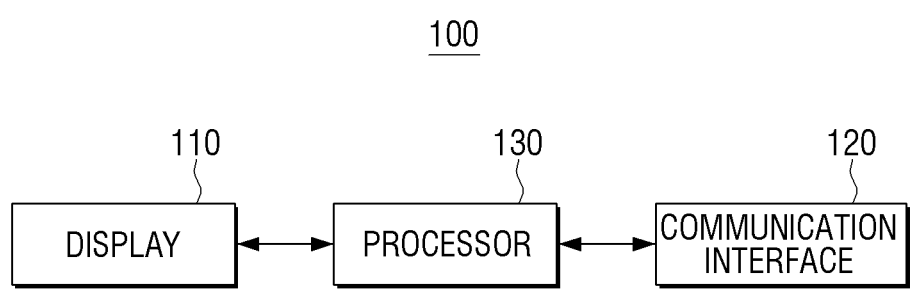
FIG. 2 is a block diagram illustrating a configuration of a display device according to an embodiment of the disclosure.

FIG. 2 is a block diagram illustrating a configuration of the display device according to an embodiment of the disclosure.

Referring to FIG. 2, the display device 100 includes a display 110, a communication interface 120, and a processor 130.

The display 110 may be implemented by various types of displays such as a liquid crystal display (LCD), an organic light emitting diode (OLED) display, a quantum dot light emitting diode (QLED) display, and a plasma display panel (PDP). A driving circuit, a backlight unit, and the like, that may be implemented in a form such as a-si thin film transistor (TFT), a low temperature poly silicon (LTPS) TFT, and an organic TFT (OTFT) may be included in the display 110. According to an embodiment, the display 110 may be implemented by a touch screen combined with a touch sensor, a flexible display, a three-dimensional (3D) display, or the like.

Further, the display 110 according to an embodiment of the disclosure may include a display panel outputting an image, and a bezel housing the display panel. Particularly, the bezel according to an embodiment of the disclosure may include a touch sensor (not illustrated) for detecting user interaction.

The communication interface 120 is a component performing communication with various types of external devices in various types of communication manners.

According to an embodiment, the communication interface 120 may be implemented by any one of HDMI, AV, composite, mobile high-definition link (MHL), universal serial bus (USB), DisplayPort (DP), a thunderbolt, a video graphics array (VGA) port, an RGB port, a D-subminiature (D-SUB), or a digital visual interface (DVI).

According to another embodiment, the communication interface 120 includes at least one of a Wi-Fi module, a Bluetooth module, an infrared communication module, or a wireless communication module. Here, each communication module may be implemented in a form of at least one hardware chip. The Wi-Fi module and the Bluetooth module perform communication in a Wi-Fi manner and a Bluetooth manner, respectively. In the case of using the Wi-Fi module or the Bluetooth module, various coupling information such as a service set identifier (SSID) and a session key is first transmitted and received, communicative coupling is established using the coupling information, and various information may then be transmitted and received. The infrared communication module performs communication according to an infrared data association (IrDA) technology using infrared light which lies between visible light and millimeter waves for short-distance wireless data transmission.

The wireless communication module may include at least one communication chip performing communication according to various wireless communication standards such as Zigbee, 3rd generation (3G), 3rd generation partnership project (3GPP), long term evolution (LTE), LTE Advanced (LTE-A), 4th generation (4G), and 5th generation (5G), in addition to the communication manner described above.

In addition, the communication interface 120 may include at least one of a local area network (LAN) module, an Ethernet module, or a wired communication module performing communication by using a pair cable, a coaxial cable, an optical fiber cable, or the like.

The processor 130 may be implemented by a digital signal processor (DSP) processing a digital signal, a microprocessor, or a time controller (TCON). However, the disclosure is not limited thereto, and the processor 130 may include one or more of a central processing unit (CPU), a micro controller unit (MCU), a micro processing unit (MPU), a controller, an application processor (AP), a graphics-processing unit (GPU), a communication processor (CP), or an ARM processor, or may be defined by these terms. In addition, the processor 130 may be implemented by a system-on-chip (SoC) or a large scale integration (LSI) in which a processing algorithm is embedded, or may be implemented in a field programmable gate array (FPGA) form. The processor 130 may perform various functions by executing computer executable instructions stored in the memory 140.

The processor 130 may control the communication interface 120 to perform communication with the electronic device 200. In the case of using the Wi-Fi communication manner according to an example, an operation of accessing an Access Point (AP) or an operation for performing communication with the electronic device 200 including a softAP may be performed based on a predetermined event.

The processor 130 may obtain an advertising content for the electronic device 200 based on identification information of the electronic device 200 received through the communication interface 120, and control the display 110 to display the obtained advertising content. Here, the identification information may include at least one of a model name, manufacturer information, or device type information (product family information), but is not limited thereto.

According to an embodiment, the processor 130 may receive a packet through communicative coupling with the electronic device 200, and obtain the identification information of the electronic device 200 from information included in the packet. According to an embodiment, the packet may be a predetermined packet. Here, the communicative coupling may mean all operations related to communicative coupling, such as a communication initialization operation, a network establishment operation, and a device pairing operation, in a predefined communication manner.

According to an embodiment, the processor 130 may obtain mode information at least one of the display device 100 or the electronic device 200, the processor 130 may obtain advertising content for the external device based on the identification information of the external device included in the data packet and based on the mode information. Here, the mode information may correspond to one of a location of the display device or a location of the external device. Also, the data packet may comprise the mode information.

According to an example, the display device 100 and the electronic device 200 may be implemented by devices supporting HDMI. Accordingly, the communication interface 120 may be implemented by an HDMI interface, and the display device 100 and the electronic device 200 may perform communication with each other through the corresponding HDMI interface. As an example, the display device 100 and the electronic device 200 may each include an HDMI 2.0 interface or a higher version of HDMI interface. Here, HDMI 2.0 is a standard optimized for ultra-high definition which is also called 4K or UHD (ultra HD), or a higher resolution environment. A maximum bandwidth is increased to 48 Gbps, and 144 Hz of ultra-high-definition high dynamic range (HDR) content (10-bit color encoding) may be transmitted without any problem. In addition, 30 Hz of a content of 8K (7680×4320) which is a higher resolution standard than 4K may be transmission without being compressed.

In this case, the processor 130 may obtain the identification information of the electronic device 200 from a source product description (SPD) packet received through the communicative coupling between the display device 100 and the electronic device 200 through the HDMI interface. Here, the SPD packet may be an SPD infoframe.

The SPD infoframe has a format as illustrated in FIG. 3A and is information regarding a source device that is transferred from the source device to a sync device and defined in the HDMI specification. The SPD infoframe is constituted by 25 bytes for providing detailed information regarding the source device to the sync device.

Figure 3B:
FIG. 3B illustrates another example of the SPD packet according to an embodiment of the disclosure.

The SPD infoframe is described in CTA-861G included in the HDMI specification. For example, the SPD infoframe may include information such as a name of a vendor which is a manufacturer of a corresponding product, a product name indicates what the product is, and a type of the source device. FIG. 3B illustrates an example of the SPD infoframe, and FIG. 3C illustrates an example of information included in a 25-th byte.

The processor 130 may obtain an advertising content for the electronic device 200 based on at least one of a model name, manufacturer information, or device type information (product family information) included in the SPD infoframe. As an example, the processor 130 may transmit information including a model name to the external server, and receive an advertising content corresponding to the corresponding model name from the external server. As another example, the processor 130 may identify an HDMI version supported by the electronic device 200 based on the information included in the SPD infoframe. In this case, the processor 130 may also receive an advertising content according to the HDMI version supported by the electronic device 200 from the external server.

As another example, the communication interface 120 may be implemented by a Wi-Fi module or a Bluetooth module, and the display device 100 and the electronic device 200 may perform communication with each other through the corresponding communication module. In this case, the processor 130 may obtain the identification information of the electronic device 200 from a wireless packet received by being coupled (or connected) to the electronic device 200 through Wi-Fi communication or Bluetooth communication.

According to an embodiment, the communication interface 120 may be implemented by a Wi-Fi module. In this case, the display device 100 may use a Wi-Fi network by accessing an access point (AP), and may perform communication with the electronic device 200 through the Wi-Fi network. A Wi-Fi packet (for example, a media access control (MAC) frame) used in Wi-Fi communication includes information such as a receiving address and a sending address.

For example, the electronic device 200 may include the softAP to serve as a wireless router. In this case, the electronic device 200, that is, the AP may broadcast a beacon packet to announce its presence, and the beacon packet may include a service set identifier (SSID), a channel, encryption, a transmission rate, and the like. Here, the SSID indicates an identifier of a Wi-Fi router, and the processor 130 may obtain the identification information of the electronic device 200 by using the SSID information. As an example, in the case where the SSID information includes at least one of a model name, manufacturer information, or device type information (product family information), the SSID information may be used as the identification information. As another example, in the case where the SSID information does not include at least one of a model name, manufacturer information, or device type information (product family information), at least one of a model name, manufacturer information, or device type information (product family information) may be obtained based on information mapped to the corresponding SSID information.

Figure 4A:
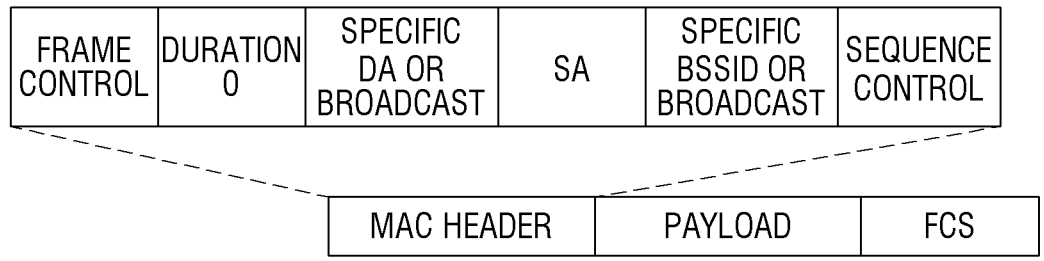
FIG. 4A illustrates an example of a probe request packet in accordance with a wireless fidelity (Wi-Fi) standard according to an embodiment of the disclosure, respectively.
Figure 4B:
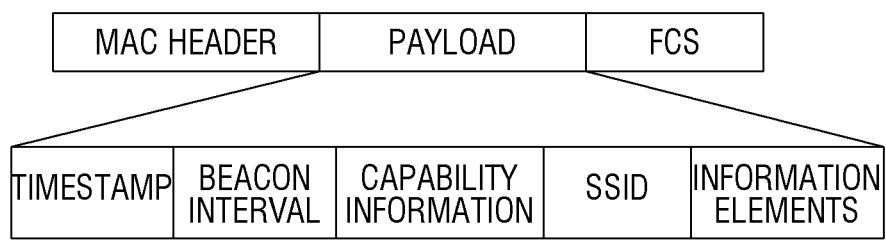
FIG. 4B illustrates another example of a probe response packet in accordance with a wireless fidelity (Wi-Fi) standard according to an embodiment of the disclosure, respectively.

Further, an authentication procedure for accessing the electronic device 200 may be performed after the display device 100 receives the beacon packet. In the authentication procedure, the display device 100 transmits a probe request packet (or frame) to the electronic device 200 and receives a probe response packet (or frame) from the electronic device 200. In this case, it is also possible to obtain the identification information of the electronic device 200 included in the probe response packet. FIGS. 4A and 4B illustrate examples of a probe request packet and a probe response packet in accordance with a Wi-Fi standard, respectively. However, the display device 100 may also serve as a wireless router, and in this case, it is also possible to obtain the identification information of the electronic device 200 included in the probe request packet (or frame) transmitted from the electronic device 200 to the display device 100.

According to another embodiment, the communication interface 120 may be implemented by a Bluetooth module. The display device 100 and the electronic device 200 enter a ready mode for Bluetooth pairing. For example, the display device 100 may enter a device search mode, and the electronic device 200 may enter a mode in which the electronic device 200 may be searched for.

Figure 5:
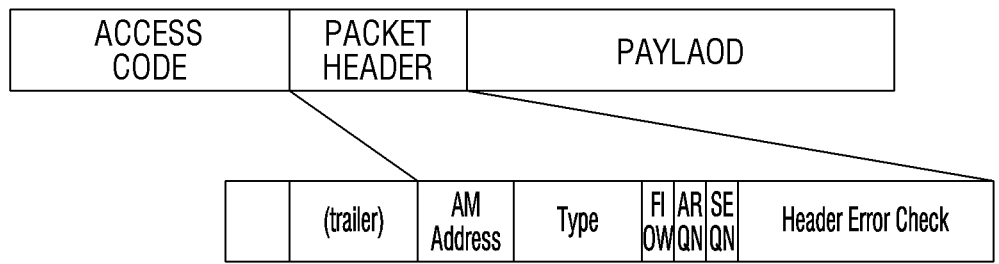
FIG. 5 illustrates an example of a response packet in accordance with a Bluetooth standard according to an embodiment of the disclosure.

Then, the display device 100 broadcasts an inquiry packet to search for a peripheral device that may be coupled through Bluetooth, and the electronic device 200 receiving the inquiry packet transmits a response packet including identification information of the electronic device 200. In this case, the display device 100 may obtain the identification information of the electronic device 200. FIG. 5 illustrates an example of a response packet in accordance with a Bluetooth standard.

However, the electronic device 200 may also serve to search for a peripheral device, and in this case, it is also possible to obtain the identification information of the electronic device 200 included in the inquiry packet broadcasted by the electronic device 200.

As described above, the processor 130 may obtain identification information of the electronic device 200 based on information included in a packet transmitted and received in various communication manners.

Although only the case where the identification information of the electronic device 200 is received in a process of communicative coupling in a predetermined communication manner has been described, but the disclosure is not necessarily limited thereto. For example, the case where the display device 100 transmits a signal for requesting the identification information of the electronic device 200 to the electronic device 200 based on an event, and the electronic device 200 transmits the corresponding identification information to the display device 100 in response to the request, in a state in which the display device 100 and the electronic device 200 may perform communication with each other, is also possible. Here, the event may be a predetermined event may be an event of entering a predetermined display mode (for example, a shop mode or a store mode, which is a mode in which the display apparatus 100 and/or the electronic device 200 is located in a shop or a store), an event of pairing between the display device 100 and the electronic device 200, an event in which the electronic device 200 is powered-on, an event in which a predetermined menu (for example, a menu for providing an advertisement for the electronic device 200) is selected, or an event in which a predetermined bit of a packet received from the electronic device 200 is activated, but is not limited thereto. For example, once the electronic device 200 enters the shop mode, the electronic device 200 may activate a bit (which may be a predetermined bit, for example, a reserved bit) of the SPD packet to be "1" and then transmit the SPD packet to the display device 100, and the electronic device 200 may confirm that the electronic device 200 enters the shop mode based on the corresponding information.

According to an embodiment, the processor 130 may obtain an advertising content for the electronic device 200 from at least one of a memory 140 (FIG. 6) included in the display device 100, an external server, or the electronic device 200.

According to an embodiment, the processor 130 may obtain an advertising content corresponding to the identification information of the electronic device 200 from the memory 140 (FIG. 6) storing advertising contents. In this case, the memory 140 (FIG. 6) may store an advertising content corresponding to identification information of each device.

According to another embodiment, the processor 130 may transmit the identification information (for example, a model name) of the electronic device 200 to the external server, and obtain an advertising content for the electronic device 200 from the external server. In this case, the external server may store an advertising content corresponding to identification information of each device. For example, the external server may store an advertising content corresponding to a model name of each device. Further, the external server may store an advertising content corresponding to an update version of each device.

According to an embodiment, the display device 100 may perform communication with the external server through a network such as Ethernet, Metro Ethernet, Gigabit Ethernet, digital subscriber line (DSL), Frame Relay, integrated services digital network (ISDN), asynchronous transfer mode (ATM), satellite Internet, synchronous optical network (SONET), a wireless LAN, a cable modem, or Fiber to the Home (FTTH). However, the disclosure is not limited thereto, and a communication network such as Wi-Fi may also be used. For example, the display device 100 may access an AP through the Wi-Fi network to access the external server through an Internet service provided by an Internet service provider (ISP).

According to still another embodiment, the processor 130 may check whether or not an advertising content corresponding to the identification information of the electronic device 200 is stored in the memory 140, and in the case where the advertising content is not stored in the memory 140, the processor 130 may transmit the identification information of the electronic device 200 to the external server and obtain an advertising content for the electronic device 200 from the external server. For example, the processor 130 may check whether or not an advertising content corresponding to a model name of the electronic device 200 is stored in the memory 140, and in the case where the advertising content is not stored in the memory 140, the processor 130 may transmit the identification information of the electronic device 200 to the external server to request for the corresponding advertising content. For example, the processor 130 may check whether or not an advertising content corresponding to a model name and an update version of the electronic device 200 is stored in the memory 140, and in the case where the advertising content is not stored in the memory 140, the processor 130 may transmit the identification information of the electronic device 200 to the external server to request for the corresponding advertising content.

According to further still another embodiment, once a first advertising content corresponding to the identification information of the electronic device 200 is received from the external server, the processor 130 may compare the first advertising content with a second advertising content corresponding to identification information of an external device and obtained from the memory 140, and in the case where it is identified that an update version of the first advertising content is higher than an update version of the second advertising content as a result of the comparison, the second advertising content stored in the memory 140 may be updated to the first advertising content. Here, the update may not only include replacing the second advertising content with the first advertising content and storing the first advertising content, but also include adding the first advertising content while maintaining the second advertising content.

According to further still yet another embodiment, the processor 130 may identify whether or not the external server may provide the advertising content for the electronic device 200 based on information stored in the memory 140 or information received from the external server. For example, a list including model names of devices for which the latest version of advertising content is provided from the external server may be stored in the memory 140 or the corresponding list information may be received from the server.

The processor 130 may compare the identification information of the electronic device 200, for example, a model name included in the SPD infoframe, with the corresponding list to identify whether or not an advertising content may be received from the external server, and in the case where it is identified that the advertising content may be received from the external server, the processor 130 may transmit the identification information of the electronic device 200 to the external server to request for the corresponding advertising content. In this case, the processor 130 may continuously update the list stored in the memory 140 through a network. For example, a model name of a source device manufactured by each manufacturer is created according to a predetermined rule, and thus the list may be updated with reference to the corresponding rule.

According to an embodiment, in the case of receiving not only the identification information of the electronic device 200, but also information regarding the display device 100, the external server may provide an advertising content corresponding to the information regarding the display device 100 among a plurality of types of advertising contents corresponding to the identification information of the electronic device 200. For example, in the case of receiving the information regarding the display device 100, such as a manufacturer name, a date of manufacture, a product type, a model name, an extended display identification data (EDID) version, resolution and color coordinates, a type of a phosphor or filter, timing, a screen size, luminance, and pixels, the external server may provide a corresponding type of advertising content based on the received information.

However, according to another embodiment, the electronic device 200 may transmit the identification information thereof to the external server and the external server may provide an advertising content corresponding to the identification information of the electronic device 200 to the display device 100.

Alternatively, the electronic device 200 may transmit the identification information thereof to the external server, receive a corresponding advertising content from the external server, and provide the advertising content to the display device 100. In this case, the electronic device 200 may transmit the information regarding the display device 100 to the external server and the external server may provide an appropriate type of advertising content based on the received information regarding the display device 100. For example, in the case of performing communication with the display device 100 through the HDMI interface, the electronic device 200 may transmit the information regarding the display device 100 to the external server based on EDID information received from the display device 100. Here, the EDID is a standard for transferring display information from the display device 100 (display side) to the electronic device 200 (host side). The EDID may include information such as a manufacturer name, a date of manufacture, a product type, an EDID version, resolution and color coordinates, a type of a phosphor or filter, timing, a screen size, luminance, and pixels.

According to an embodiment, according to an embodiment, once the event of entering a predetermined display mode occurs, the processor 130 may obtain an advertising content for the electronic device 200 based on the identification information received from the electronic device 200.

For example, once the display device 100 enters the shop mode, the processor 130 may obtain identification information of the electronic device 200 from an SPD packet, and obtain an advertising content for the electronic device 200 based on the obtained identification information. Alternatively, in a state in which the identification information of the electronic device 200 is obtained from the SPD packet, once the display device 100 enters the shop mode, the processor 130 may obtain an advertising content for the electronic device 200 based on the obtained identification information. Alternatively, once both the display device 100 and the electronic device 200 enter the shop mode, the processor 130 may obtain an advertising content for the electronic device 200 based on the obtained identification information. Here, whether or not the electronic device 200 enters the shop mode may be identified based on at least one of a control signal received from the electronic device 200, information included in a packet received from the electronic device 200, or a user command.

According to another embodiment, the processor 130 may perform a control to make the display device 100 enter the predetermined display mode based on an operation state of the electronic device 200. For example, once a signal indicating that the electronic device 200 enters the predetermined mode, for example, the shop mode, is received from the electronic device 200, the processor 130 may perform a control to make the display device 100 enter the shop mode. That is, the processor 130 may enter the shop mode in which an advertising content is provided on one region of the display 110 based on the signal received from the electronic device 200 to provide the advertising content for the electronic device 200. However, it is a matter of course that the advertising content may be provided only based on the mode of the display device 100 regardless of the mode of the electronic device 200 as described above.

According to still another embodiment, in the case where communicative coupling with the electronic device 200 is established in a state in which the display device 100 is in the predetermined display mode, for example, the shop mode, the processor 130 may provide an advertising content for the electronic device 200 according to a user command, or may provide advertising contents of both of the display device 100 and the electronic device 200 on different regions in the display 110. For example, whether an advertising content for the display device 100 or an advertising content for the electronic device 200 is to be provided on an advertising region provided in an advertising mode may be identified based on a user command, and a corresponding advertising content may be provided based on the identification result.

According to further still another embodiment, the processor 130 may alternately provide a first advertising content for the display device 100 and a second advertising content for the electronic device 200 at predetermined time intervals, or may provide a predetermined advertising content under the control of the user in each time zone.

According to further still yet another embodiment, the processor 130 may change positions at which the first advertising content for the display device 100 and the second advertising content for the electronic device 200 are provided at predetermined time intervals, or may provide an advertising content corresponding to a predetermined region under the control of the user in each time zone.

According to an embodiment, the processor 130 may superimpose the advertising content for the electronic device 200 on a partial region of the display 110 on which a video is displayed to display the advertising content. For example, the advertising content may be provided in a form of an on-screen display (OSD), but is not limited thereto. Here, the partial region of the display 110 may be at least one of partial regions on the upper side, the lower side, the left side, and the right side of the screen, but is not limited thereto.

According to an example, in the case where the first advertising content for the display device 100 and the second advertising content for the electronic device 200 are provided at the same time, the corresponding advertising contents may be provided in spaced-apart relationship. For example, the first advertising content may be provided on the left side of the screen of the display 110, and the second advertising content may be provided on the right side of the screen of the display 110. Alternatively, positions of the first and second advertising contents may be determined based on a relative position of the electronic device 200 to a position of the display device 100. For example, in the case where the electronic device 200 is located on the left of the display device 100, the first advertising content may be provided on the right side of the screen of the display 110, and the second advertising content may be provided on the left side of the screen of the display 110. Here, the relative position of the electronic device 200 may be identified based on various information such as a user input, a position sensing technology, and a position of the communication interface 120.

Further, the processor 130 may provide guide information indicating that an advertising content displayed on the display 110 is a content corresponding to the electronic device 200 performing communication with the display device 100. For example, the processor 130 may provide guide information such as "currently coupled external device" on a region on which the advertising content is displayed, in addition to the advertising content.

According to an embodiment, the electronic device 200 may include a memory, a communication interface, and a processor.

Figure 6:
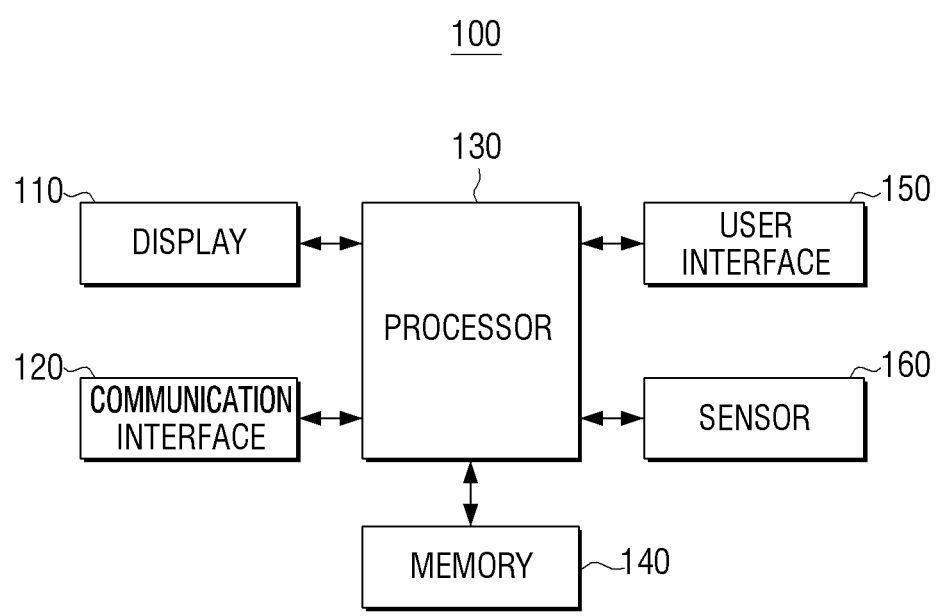
FIG. 6 is a block diagram illustrating a specific configuration of a display device according to an embodiment of the disclosure.

FIG. 6 is a block diagram illustrating a specific configuration of the display device according to an embodiment of the disclosure.

Referring to FIG. 6, the display device 100 may include a display 110, a communication interface 120, a processor 130, a memory 140, a user interface 150, and a sensor 160. A detailed description of components overlapped with components illustrated in FIG. 2 among components illustrated in FIG. 6 will be omitted.

According to an example, the communication interface 120 may use the same communication module (for example, Wi-Fi module) to perform communication with the electronic device 200, an external device such as a remote controller, and an external server.

According to another example, the communication interface 120 may use different communication modules to perform communication with the electronic device 200, an external device such as a remote controller, and an external server. For example, the communication interface 120 may use at least one of an Ethernet module or a Wi-Fi module to perform communication with an external server, and may use a Bluetooth (BT) module to perform communication with an external device such as a remote controller. However, this is only an example, and the communication interface 120 may use at least one of various communication modules in the case of performing communication with a plurality of external devices or external servers.

Further, the display device 100 may additionally include a tuner or a demodulator according to an implementation example. The tuner may tune a channel selected by a user or all channels stored in advance to receive a radio frequency (RF) broadcasting signal through an antenna. The demodulator may receive and demodulate a digital IF (DIF) signal converted in the tuner, and may perform channel decoding or the like.

The processor 130 may control a general operation of the display device 100 using various programs stored in the memory 140.

According to an example, the processor 130 may access the memory 140 to perform booting using the O/S stored in the memory 140. In addition, the processor 130 may perform various operations using various programs, content data, and the like, stored in the memory 140.

According to an embodiment, the processor 130 may perform a graphic processing function (video processing function). For example, the processor 130 may render a screen including various objects such as an icon, an image, and a text by using a calculator and a renderer. Here, the calculator may calculate attribute values such as coordinate values at which the respective objects will be displayed, forms, sizes, and colors of the respective objects depending on a layout of the screen based on a received control command. Further, the renderer may render screens of various layouts including objects based on the attribute values calculated in the calculator. According to an embodiment, the corresponding operation may be performed by a GPU provided separately from the processor 130. Further, the processor 130 may perform various kinds of image processing such as decoding, scaling, noise filtering, frame rate conversion, and resolution conversion with respect to the video data.

According to an embodiment, the processor 130 may perform processing with respect to audio data. Specifically, the processor 130 may perform various kinds of processing such as decoding, amplifying, and noise filtering with respect to the audio data.

The memory 140 may store an advertising content corresponding to identification information of the external electronic device 200. For example, the memory 140 may store an advertising content corresponding to a model name of each device. Further, the external server may store an advertising content corresponding to an update version of each device.

The memory 140 may be implemented by an internal memory such as a read-only memory (ROM) (for example, an electrically erasable programmable read only memory (EEPROM)) or a random access memory (RAM) included in the processor 130 or be implemented by a memory separate from the processor 130. In this case, the memory 140 may be implemented in a form of a memory embedded in the display device 100 or in a form of a memory attachable to and detachable from the display device 100, depending on a data storing purpose. For example, data for driving the display device 100 may be stored in the memory embedded in the display device 100, and data for an extension function of the display device 100 may be stored in the memory attachable to and detachable from the display device 100. According to an embodiment, the memory embedded in the display device 100 may be implemented by at least one of a volatile memory (for example, a dynamic RAM (DRAM), a static RAM (SRAM), or a synchronous dynamic RAM (SDRAM)), a non-volatile memory (for example, a one time programmable ROM (OTPROM), a programmable ROM (PROM), an erasable and programmable ROM (EPROM), an EEPROM, a mask ROM, a flash ROM, a flash memory (for example, a NAND flash or a NOR flash), a hard drive, or a solid state drive (SSD), and the memory attachable to and detachable from the display device 100 may be implemented by a memory card (for example, a compact flash (CF), a secure digital (SD), a micro secure digital (Micro-SD), a mini secure digital (Mini-SD), an extreme digital (xD), or a multi-media card (MMC)), an external memory (for example, a USB memory) connectable to the USB port, or the like.

The user interface 150 may be implemented by a device such as a button, a touch pad, a mouse, or a keyboard, or may be implemented by a touch screen that may perform the above-described display function and an operation input function. Here, the button may be various types of buttons such as a mechanical button, a touch pad, and a wheel formed in any region such as a front surface portion, a side surface portion, or a rear surface portion of a body appearance of the display device 100.

The sensor 160 may sense a user in the vicinity of the display apparatus. For example, the sensor 160 may be implemented by a camera, a stereo camera, an infrared camera, or a depth camera. The sensor 160 may be disposed in an outer side region of the display device 100. For example, the sensor 160 may be disposed in a central upper region, a central left region, or a central right region of a bezel of the display device 100, but the disclosure is not limited thereto.

According to an embodiment, the processor 130 may determine at least one of a type of the advertising content, a display position of the advertising content, or a display time of the advertising content, based on user sensing data received from the sensor 160.

Specifically, the processor 130 may identify a user profile based on the user sensing data and determine at least one of a type of the advertising content, a display position of the advertising content, or a display time of the advertising content based on the identified user profile. Here, the user profile may include at least one of the age of the user, the height of the user, the sex of the user, or the race of the user.

For example, the processor 130 may determine a type of the advertising content based on at least one of the age of the user or the sex of the user. Here, the type of the advertising content may be classified based on a format of the advertising content, a display size of the advertising content, a language, a size, or a font of text included in the advertising content, a size and a color of an image included in the advertising content, a gist of the advertising content, and the like. According to an example, in the case where it is identified that the user is an elderly person, the advertising content may be provided while increasing a size of text to a threshold value or more. For example, the processor 130 may determine a display position of the advertising content based on the height of the user.

According to another embodiment, in the case where a third advertising content for the display device 100 and a fourth advertising content for the electronic device 200 are displayed together, the processor 130 may determine at least one of a display position, a display size, or a display time of each of the third advertising content and the fourth advertising content based on the user sensing data received from the sensor 160.

Specifically, the processor 130 may identify at least one of user gaze information or user profile information based on the user sensing data, and determine at least one of a display position, a display size, or a display time of each of the third advertising content and the fourth advertising content based on the identified information. For example, in the case where it is identified that the user is interested in the electronic device 200 based on the user gaze information, the processor 130 may display the fourth advertising content in a larger size than that of the third advertising content.

FIGS. 7A, 7B, 8A and 8B are views for describing advertising content display methods according to various embodiments of the disclosure.

Figure 7A:
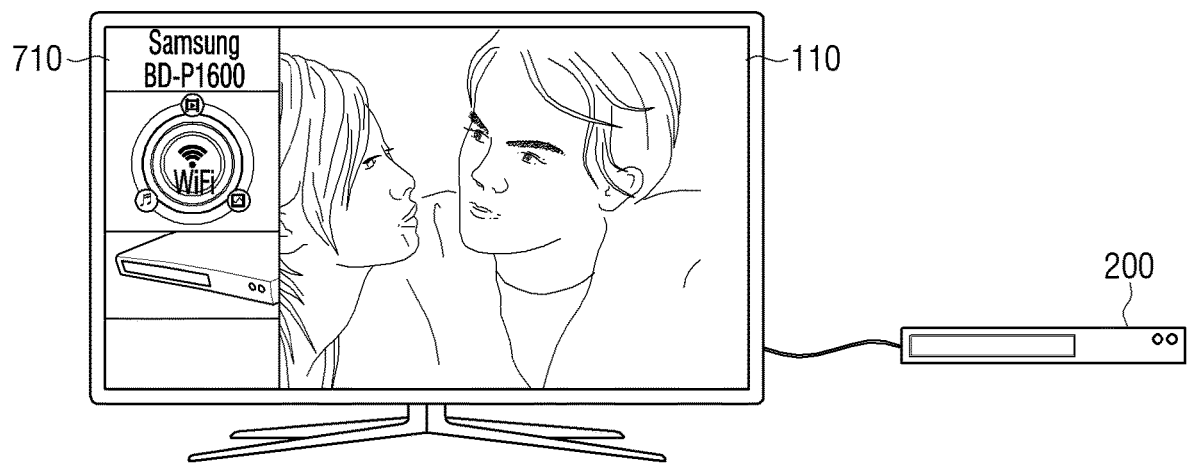
FIG. 7A is a view illustrating an example of an advertising content display method according to an embodiment of the disclosure.

According to an embodiment of the disclosure, as illustrated in FIG. 7A, the display device 100 may obtain identification information of the external electronic device 200 in a predetermined display mode, for example, the shop mode or the advertising mode, and display an advertising content 710 corresponding to the obtained identification information on a region. For example, in the case where the display device 100 and the electronic device 200 perform communication with each other through the HDMI interface, the display device 100 may obtain identification information of the electronic device 200 from an SPD packet received from the electronic device 200.

Figure 7B:
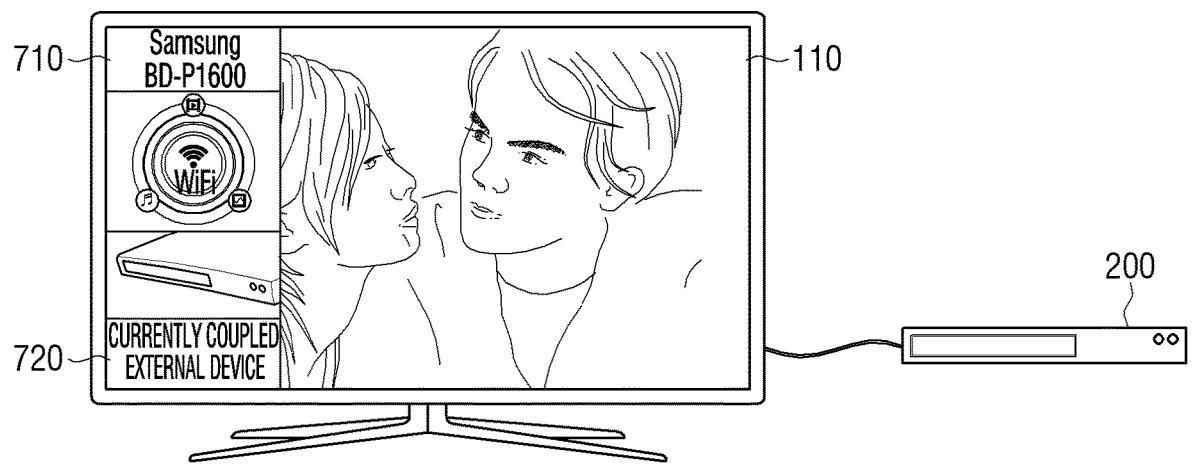
FIG. 7B is a view illustrating another example of an advertising content display method according to an embodiment of the disclosure.

According to another embodiment of the disclosure, as illustrated in FIG. 7B, guide information 720 indicating that the advertising content 710 that is currently displayed is an advertising content for a currently coupled external device may be provided adjacent to the advertising content 710.

Figure 8A:
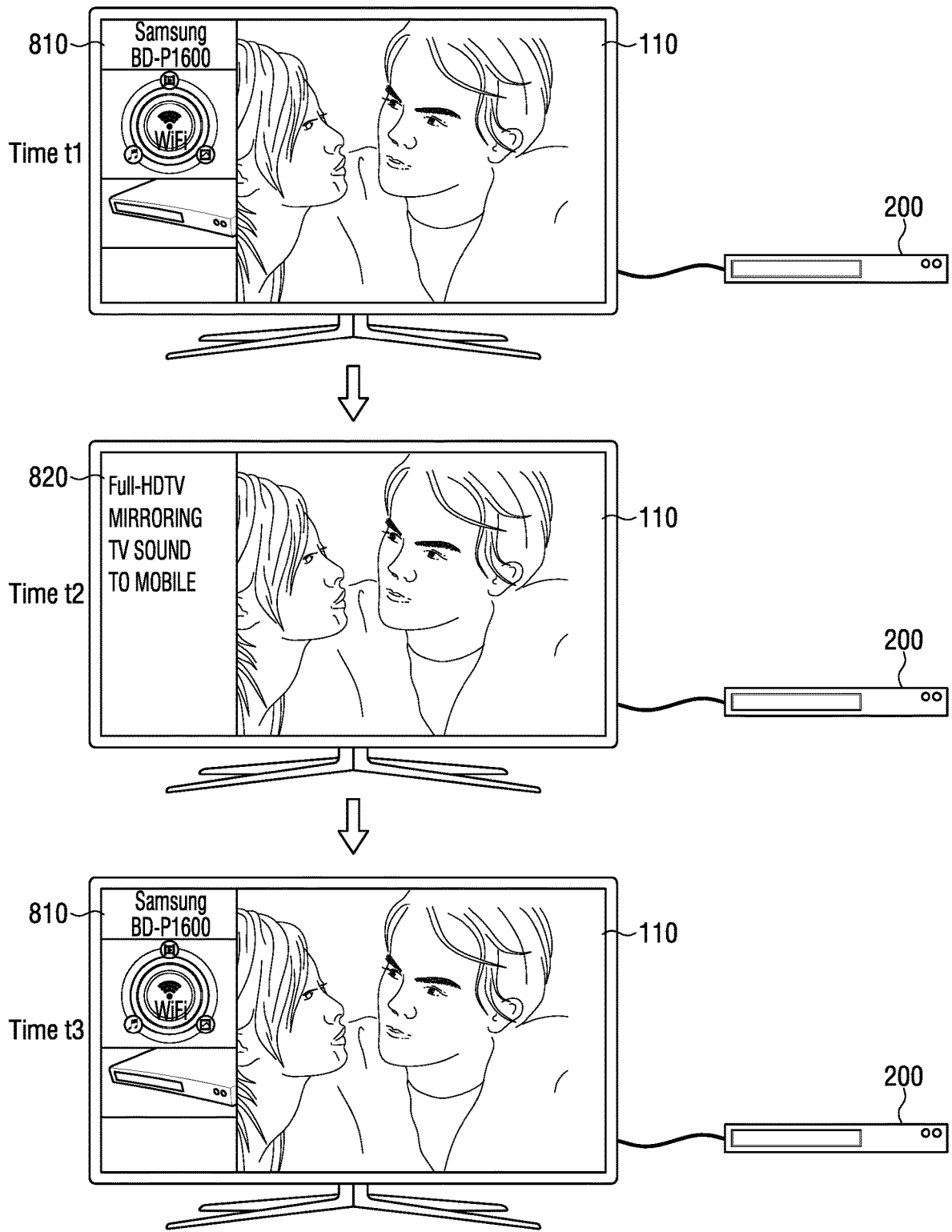
FIG. 8A is a view illustrating an example of an advertising content display method according to an embodiment of the disclosure.

According to still another embodiment of the disclosure, as illustrated in FIG. 8A, an advertising content 810 for the display device and an advertising content 820 for the electronic device may be alternately provided at predetermined time intervals (i.e, time t1, time t2 and time t3). However, according to another embodiment, the advertising content 810 for the display device and the advertising content 820 for the electronic device may be simultaneously provided on one screen. For example, the advertising content 810 for the display device may be provided on the left side of the screen, and the advertising content 820 for the electronic device may be provided on the right side of the screen. In this case, a display position of each advertising content may be determined depending on a user setting, locations of the display device 100 and the electronic device 200, and the like.

Figure 8B:
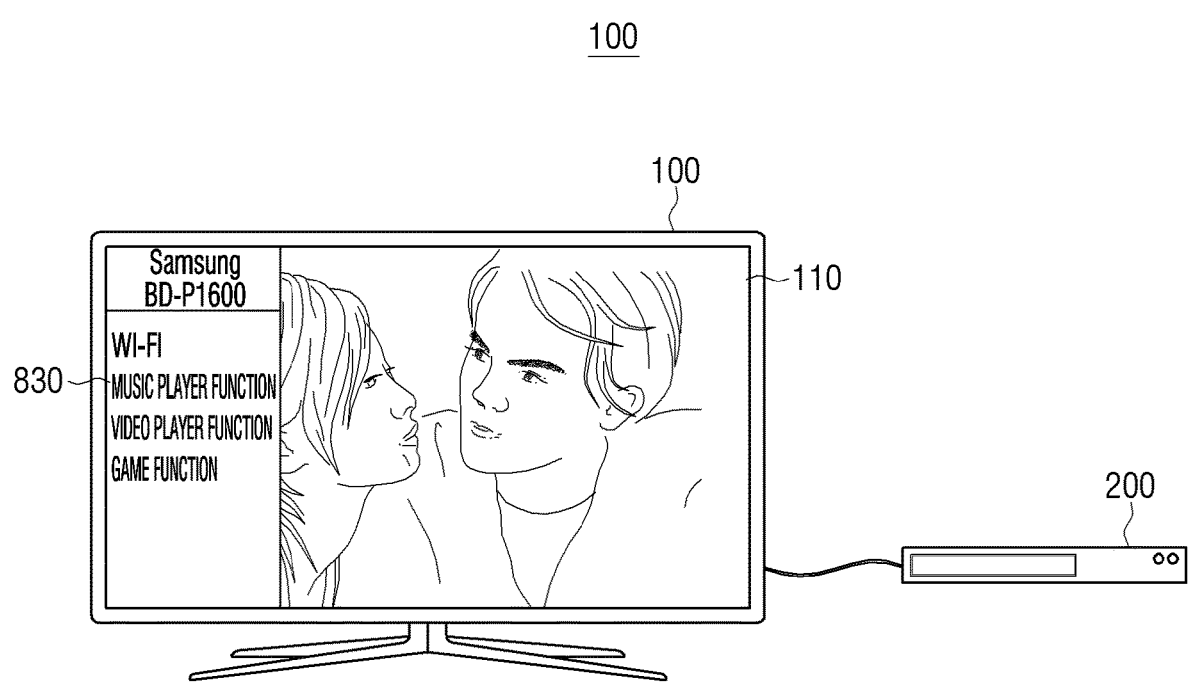
FIG. 8B is a view illustrating an example of an advertising content display method according to an embodiment of the disclosure.

According to further still another embodiment of the disclosure, as illustrated in FIG. 8B, the display device 100 may determine a type of an advertising content 830 for an electronic device based on the user sensing data. For example, in the case where it is identified that the user is an old person based on the user sensing data, a change to an easy-to-understand type of advertising content 830, unlike the advertising content 710 illustrated in FIG. 7A, may be performed to provide the advertising content 830.

Figure 9:
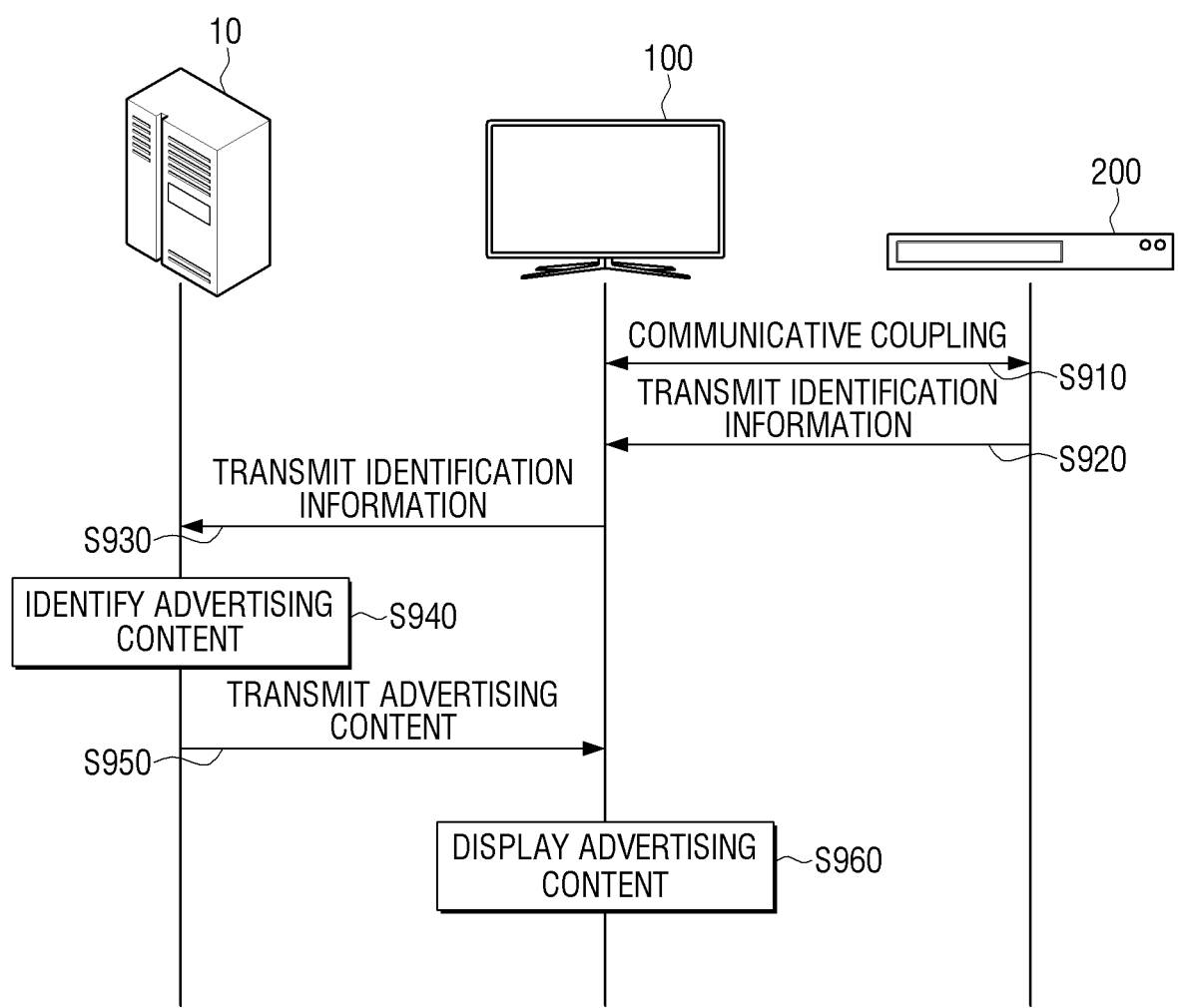
FIG. 9 is a sequence diagram for illustrating an advertising content providing method according to an embodiment of the disclosure.

FIG. 9 is a sequence diagram for describing an advertising content providing method according to an embodiment of the disclosure.

In S910, a process in which the display device 100 and the electronic device 200 are coupled to each other in a predetermined communication manner is initiated. Once the display device 100 and the electronic device 200 are coupled to each other in a predetermined communication manner or in the process in which the display device 100 and the electronic device 200 are coupled to each other in a predetermined communication manner (S910), the electronic device 200 may transmit a packet including identification information of the electronic device 200 to the display device 100 (S920). For example, the electronic device 200 may transmit, to the display device 100 in the communicative coupling process, at least one of an SPD packet including the identification information of the electronic device 200 according to the HDMI communication manner, a probe response packet (or probe request packet) according to the Wi-Fi communication manner, or a Bluetooth packet according to the Bluetooth communication manner. However, this is only an example, and it is a matter of course that the display device 100 may receive the identification information of the electronic device 200 from the electronic device 200, separately from the communicative coupling process. For example, in the case where the display device 100 may transmit a packet for requesting the identification information to the electronic device 200, and the electronic device 200 may transmit a packet including the identification information of the electronic device 200 to the display device 100 in response to the request.

Once the identification information of the electronic device 200 is obtained, the display device 100 may transmit the obtained identification information to a server 10 to request for a corresponding advertising content (S930). In this case, the server 10 may identify a corresponding advertising content based on the identification information of the electronic device 200 (S940), and transmit the identified advertising content to the display device 100 (S950). If necessary, the display device 100 may check whether or not an advertising content corresponding to the identification information of the electronic device 200 is stored in the memory 140, and in the case where the advertising content is not stored in the memory 140, the display device 100 may request the server 10 for the advertising content.

The display device 100 displays the advertising content received from the server 10 on a region of the screen (S960).

Figure 10:
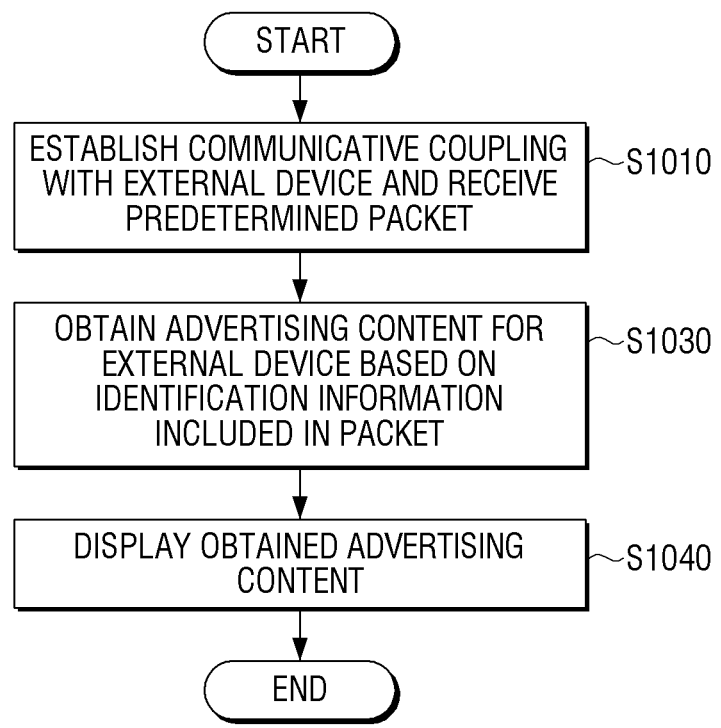
FIG. 10 is a flowchart for describing a method for controlling a display device according to an embodiment of the disclosure.

FIG. 10 is a flowchart for describing a method for controlling a display device according to an embodiment of the disclosure.

According to the method for controlling a display device illustrated in FIG. 10, the display device establishes communicative coupling with an external device through a communication interface, and receives a predetermined packet from the external device through the communicative coupling (S1010).

Then, an advertising content for the external device is obtained based on identification information of the external device included in the predetermined packet (S1020).

Next, the obtained advertising content is displayed (S1030).

Here, the identification information of the external device may include at least one of a model name, manufacturer information, or device type information of the external device.

Further, in the obtaining of the advertising content (S1020), the identification information of the external device may be obtained from an SPD packet received through the communication interface in accordance with an HDMI communication standard.

Alternatively, in the obtaining of the advertising content (S1020), the identification information of the external device may be obtained from a wireless packet received through the communication interface in accordance with at least one of a Wi-Fi communication standard or a Bluetooth communication standard.

Further, in the obtaining of the advertising content (S1020), the identification information of the external device may be transmitted to an external server, and an advertising content corresponding to the identification information of the external device may be received from the external server.

Further, the obtaining of the advertising content (S1020) may include: identifying whether or not the advertising content corresponding to the identification information of the external device is stored in a memory; and transmitting the identification information of the external device to the external server and receiving the advertising content corresponding to the identification information of the external device from the external server, in the case where it is identified that the advertising content corresponding to the identification information of the external device is not stored in the memory.

Further, the method for controlling a display device may include: comparing a first advertising content with a second advertising content corresponding to the identification information of the external device and obtained from the memory, based on the first advertising content corresponding to the identification information of the external device being received from the external server; and updating the second advertising content stored in the memory to the first advertising content in the case where it is identified that an update version of the first advertising content is higher than an update version of the second advertising content, as a result of the comparison.

Further, in the displaying of the advertising content (S1030), the advertising content may be superimposed on a partial region of a display on which a video is displayed to display the advertising content.

Further, in the obtaining of the advertising content (S1020), an advertising content for the external device may be obtained based on the identification information received from the external device, once an event of entering a predetermined display mode occurs.

Further, in the displaying of the advertising content (S1030), at least one of a type of the advertising content, a display position of the advertising content, or a display time of the advertising content may be determined based on user sensing data received from a sensor.

Further, in the displaying of the advertising content (S1030), in the case where a third advertising content for the display device and a fourth advertising content for the external device are displayed together, at least one of a display position or a display time of each of the third advertising content and the fourth advertising content may be determined based on the user sensing data received from the sensor.

Further, in the displaying of the advertising content (S1030), guide information indicating that the displayed advertising content is a content corresponding to the external device performing communication with the display device.

According to various embodiments described above, it is possible to provide an advertising content for a device that does not include a display through a display device coupled to the corresponding device. As a result, user convenience may be improved.

Meanwhile, the methods according to the various embodiments of the disclosure described above may be implemented in a form of an application that may be installed in the existing electronic device.

Further, the methods according to the various embodiments of the disclosure described above may be implemented only by performing a software upgrade or a hardware upgrade with respect to the existing electronic device.

Further, the various embodiments of the disclosure described above may be executed through an embedded server provided in the electronic device, or an external server of at least one of the electronic device or the display device.

According to an embodiment of the disclosure, the various embodiments described above may be implemented by software including instructions stored in a machine-readable storage medium (for example, a computer-readable storage medium). A machine may be a device that invokes the stored instruction from the storage medium and may be operated depending on the invoked instruction, and may include the electronic device (for example, the electronic device 200) according to the disclosed embodiments. In the case where an instruction is executed by the processor, the processor may directly perform a function corresponding to the instruction or other components may perform the function corresponding to the instruction under a control of the processor. The instruction may include codes created or executed by a compiler or an interpreter. The machine-readable storage medium may be provided in a form of a non-transitory storage medium. Here, the term "non-transitory" means that the storage medium is tangible without including a signal, and does not distinguish whether data are semi-permanently or temporarily stored on the storage medium.

In addition, according to an embodiment of the disclosure, the methods according to the various embodiments described above may be included and provided in a computer program product. The computer program product may be traded as a product between a seller and a purchaser. The computer program product may be distributed in a form of a storage medium (for example, a compact disc read only memory (CD-ROM)) that may be read by the machine or online through an application store (for example, PlayStore™). In the case of the online distribution, at least portions of the computer program product may be at least temporarily stored in a storage medium such as a memory of a server of a manufacturer, a server of an application store, or a relay server or be temporarily created.

In addition, each of components (for example, modules or programs) according to the various embodiments described above may include a single entity or a plurality of entities, and some of the corresponding sub-components described above may be omitted or other sub-components may be further included in the various embodiments. Alternatively or additionally, some of the components (for example, the modules or the programs) may be integrated into one entity, and may perform functions performed by the respective corresponding components before being integrated in the same or similar manner. Operations performed by the modules, the programs, or other components according to the various embodiments may be executed in a sequential manner, a parallel manner, an iterative manner, or a heuristic manner, at least some of the operations may be performed in a different order or be omitted, or other operations may be added.

Although embodiments of the disclosure have been illustrated and described hereinabove, the disclosure is not limited to the abovementioned specific embodiments, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. A display device comprising:
 a display;
 a communication interface; and
 a processor configured to:
  establish a connection with an external device through the communication interface and receive a data packet from the external device through the established connection,
  obtain mode information of the display device identifying if the display device is in an advertising mode,
  obtain advertising content describing a feature of the external device based on identification information of the external device included in the data packet and the mode information identifying that the display device is in the advertising mode, control the display to display the obtained advertising content.

2. The display device as claimed in claim 1, wherein the identification information of the external device comprises at least one of a model name, manufacturer information, or device type information of the external device.

3. The display device as claimed in claim 1, wherein the processor is further configured to obtain the identification information of the external device from the data packet, a source product description (SPD) packet received through the communication interface in accordance with a high definition multimedia interface (HDMI) communication standard.

4. The display device as claimed in claim 2, wherein the processor is further configured to obtain the identification information of the external device from the data packet, which is a wireless data packet received through the communication interface in accordance with at least one of a wireless fidelity (Wi-Fi) communication standard or a Bluetooth communication standard.

5. The display device as claimed in claim 1, wherein the processor is further configured to transmit the identification information of the external device to an external server, and receive first advertising content corresponding to the identification information of the external device from the external server.

6. The display device as claimed in claim 5, further comprising a memory storing second advertising content, wherein the processor is further configured to transmit the identification information of the external device to the external server and receive the first advertising content corresponding to the identification information of the external device from the external server based on the second advertising content corresponding to the identification information of the external device not being stored in the memory.

7. The display device as claimed in claim 5, further comprising a memory storing second advertising content, wherein the processor is further configured to compare the first advertising content with the second advertising content, and update the second advertising content stored in the memory to the first advertising content based on identifying that an update version of the first advertising content is higher than an update version of the second advertising content, wherein the displayed advertising content is one of the first advertising content or the second advertising content.

8. The display device as claimed in claim 1, wherein the processor is further configured to control the display to superimpose the displayed advertising content on a partial region of the display on which a video is displayed.

9. The display device as claimed in claim 1, wherein the displayed advertising content is obtained based on an occurrence of an event of entering a predetermined display mode.

10. The display device as claimed in claim 1, further comprising a sensor configured to obtain user sensing data corresponding to a user, wherein the processor is further configured to determine at least one of a type of the displayed advertising content, a display position of the displayed advertising content, or a display time of the displayed advertising content, based on the user sensing data received from the sensor.

11. The display device as claimed in claim 6, further comprising a sensor configured to obtain user sensing data corresponding to a user, wherein the processor is further configured to obtain, in a case where third advertising content for the display device and the first or the second advertising content for the external device are displayed together, at least one of a display position or a display time of each of the third advertising content and the first or the second advertising content, based on the user sensing data received from the sensor.

12. The display device as claimed in claim 1, wherein the processor is further configured to display guide information indicating that the displayed advertising content is a content corresponding to the external device performing communication with the display device.

13. A method for controlling a display device, the method comprising:

establishing a connection with an external device through a communication interface and receiving a data packet from the external device through the established connection;

obtaining mode information of the display device identifying if the display device is in an advertising mode;

obtaining advertising content describing a feature of the external device based on identification information of the external device included in the data packet and the mode information identifying that the display device is in the advertising mode; and displaying the obtained advertising content.

14. The method as claimed in claim 13, wherein the identification information of the external device comprises at least one of a model name, manufacturer information, or device type information of the external device.

15. The method as claimed in claim 13, wherein in the obtaining of the advertising content, the identification information of the external device is obtained from the data packet, an SPD packet received through the communication interface in accordance with an HDMI communication standard.

16. The method as claimed in claim 13, wherein in the obtaining of the advertising content, the identification information of the external device is obtained from the data packet, a wireless packet received through the communication interface in accordance with at least one of a Wi-Fi communication standard or a Bluetooth communication standard.

17. The method as claimed in claim 13, wherein in the obtaining of the advertising content, the identification information of the external device is transmitted to an external server, and first advertising content corresponding to the identification information of the external device is received from the external server.

18. The display device as claimed in claim 1, wherein the mode information corresponds to one of a location of the display device or a location of the external device.

19. The display device as claimed in claim 1, wherein the data packet comprises the mode information.

20. A non-transitory computer-readable medium storing a computer command which allows an electronic device to perform an operation in the case where the computer command is executed by a processor of a display device, the operation including:

establishing a connection with an external device through a communication interface and receiving a data packet from the external device through the established connection;

obtaining mode information of the display device identifying if the display device is in an advertising mode;
obtaining advertising content describing a feature of the external device based on identification information of the external device included in the data packet and the mode information identifying that the display device is in the advertising mode; and
displaying the obtained advertising content.

\* \* \* \* \*